US008431866B2

(12) United States Patent
Wilson

(10) Patent No.: US 8,431,866 B2
(45) Date of Patent: Apr. 30, 2013

(54) METHOD OF INSTALLING AND REMOVING A BRACKET ON A MOUNTING SURFACE

(75) Inventor: Mark H. Wilson, Seattle, WA (US)

(73) Assignee: The Boeing Company, Chicago, IL (US)

( * ) Notice: Subject to any disclaimer, the term of this patent is extended or adjusted under 35 U.S.C. 154(b) by 1315 days.

(21) Appl. No.: 12/178,056

(22) Filed: Jul. 23, 2008

(65) Prior Publication Data

US 2010/0018959 A1 Jan. 28, 2010

(51) Int. Cl.
*B60L 1/02* (2006.01)

(52) U.S. Cl.
USPC ........... 219/202; 219/201; 219/213; 219/521; 156/71; 156/91

(58) Field of Classification Search .................... 156/71, 156/247, 272.2, 273.9, 274.2, 275.5, 275.7, 156/290, 291, 307.1, 307.7, 701, 711, 379.6, 156/379.7; 219/202
See application file for complete search history.

(56) References Cited

U.S. PATENT DOCUMENTS 6,006,136 A * 12/1999 Glucksman .................... 607/98
6,727,466 B2 * 4/2004 Hutter, III .................... 219/201
2002/0134543 A1 * 9/2002 Estes et al. .................... 165/277

* cited by examiner

*Primary Examiner* — Geoffrey S Evans
*Assistant Examiner* — James Sims, III
(74) *Attorney, Agent, or Firm* — Novatech IP Law

(57) ABSTRACT

A heat pad assembly for installation and/or removal of a bracket from a structure comprises a heating element. The heat pad assembly may have at least one and, more preferably, a plurality of perforations formed therein. The heating element may be configured to generate heat upon the application of electrical current passing therethrough. The heat pad assembly may be used for temporary installation of a bracket to a mounting surface through the use of an adhesive which is installable between the bracket and the structure.

3 Claims, 6 Drawing Sheets

METHOD OF INSTALLING AND REMOVING A BRACKET ON A MOUNTING SURFACE

CROSS-REFERENCE TO RELATED APPLICATIONS (Not Applicable)

STATEMENT RE: FEDERALLY SPONSORED RESEARCH/DEVELOPMENT (Not Applicable)

FIELD

The present disclosure relates generally to adhesive mounting of brackets, and, more particularly, to a heat pad assembly for installation and removal of brackets that are adhesively mounted to a mounting surface.

BACKGROUND

Flight testing of a vehicle such as an aircraft typically requires the mounting of a variety of test hardware on the vehicle. Such hardware may comprise, without limitation, various types of instrumentation such as accelerometers, transducers, sensors and probes. In addition, flight test hardware may also include electrical wiring which may be assembled into wiring bundles and which is used to interconnect the test instrumentation.

The mounting of such instrumentation and wiring bundles may be effectuated through the use of temporary mounting brackets positioned at various spacings on a mounting surface of the vehicle. The mounting brackets must be capable of supporting the instrumentation and wiring and of resisting the various loads encountered during testing such as aerodynamic loads, structural loads, dynamic and static loads and various other direct and indirect loads. Such indirect loads may be the result of manipulation of the wiring or hardware during testing such as during inspecting, replacing, adding or remove wiring or instrumentation.

Although mechanical fastening of the mounting brackets may provide a relatively strong and robust attachment to the mounting structure, mechanical fastening typically requires the formation of fastener holes in the structure followed by the installation of fasteners such as screws or bolts to secure the brackets to the mounting surface. Because the test article may be a production vehicle that must be returned to a clean production configuration (e.g., with little if any non-production structures or non-production structural variations) for delivery to a customer following the completion of testing, mechanical fastening of temporary mounting brackets is typically avoided.

An alternative to mechanical fastening of mounting brackets may be adhesively bonding of temporary mounting brackets to the structure for supporting test hardware. Such adhesive bonding provides sufficient strength to support the mounting brackets without requiring the formation of extraneous fastener holes in the structure. Furthermore, adhesive bonding of brackets to the structure reduces the impact of testing on production flow wherein the testing may require an interruption of vehicle assembly while the vehicle is converted to a test configuration.

Although adhesively bonded brackets provide several advantages such as those associated with returning the vehicle to a clean production configuration, the conventional method of bonding such brackets presents several disadvantages which detract from its overall utility. For example, time constraints imposed by an aggressive test and/or production schedule may necessitate the use of adhesives having rapid cure times for bonding brackets to structure.

Although a rapid cure time may reduce the time required to convert the production vehicle into the test configuration, the performance characteristics of quick-curing adhesives may be relatively limited as compared to the performance characteristics of an optimal adhesive for a given application. Such performance characteristics may include a limited operating or service temperature or unfavorable peel strength and/or shear strength of the cured adhesive. Furthermore, the use of quick-curing adhesives with higher bond strengths may have undesirable results on the adhered-to structure when removed.

In an attempt to avoid undesirable results during removal of adhesively bonded brackets, a measured amount of heat may be applied to areas of the mounting surface around the bracket. Such heat may be applied using a heat gun which allows the user to direct a concentrated flow of hot air onto the bracket and to areas of the mounting surface surrounding the bracket in an attempt to soften the adhesive and reduce the bond strength such that the bracket may be more easily removed.

Unfortunately, most of the heat that is applied by the heat gun is drawn by the bracket and the structure upon which the bracket is mounted, especially composite structures as they may have a greater capacity for thermal conductance than the adhesive. As a result, little heat goes into the adhesive such that attempts to remove the bracket without sufficiently softening the adhesive can have undesirable results. In addition, because structures upon which the bracket is mounted and especially composite structures are limited in the amount of heat they can withstand, low heat gun settings or temperatures are required when attempting to remove an adhesively bonded bracket. The lower temperature settings required on the heat gun increases the amount of total time required to remove brackets and adhesive residue from the structure.

As can be seen, there exists a need in the art for a system and method for facilitating the removal of adhesively bonded brackets from a structure such that following testing, the vehicle can be converted from a test configuration back to a clean production configuration for delivery to the customer. Furthermore, there exists a need in the art for a system and method for facilitating the removal of adhesively bonded brackets in a reduced amount of time. In this regard, there exists a need in the art for a system and method for facilitating the removal of adhesively bonded brackets from a structure without undesirably affecting the structure upon which the bracket is mounted. Finally, there exists a need in the art for a system and method which can effectuate a reduction in adhesive cure time such that an optimal adhesive having the desired performance characteristics may be selected from a wide range of adhesives without the constraint of a rapid cure time.

BRIEF SUMMARY

The above-described needs associated with adhesively bonded brackets is specifically addressed and alleviated by the various embodiments disclosed herein. More specifically, a heat pad assembly is provided to facilitate installation and/or removal of a bracket to a mounting surface of a structure. The heat pad assembly may include at least one pad layer which may comprise a heating element. The heating element may be formed as a sheet of resistive material which may include at least one, and more preferably, a plurality of openings or perforations extending therethrough in order to facilitate adhesive bonding of the bracket to the structure. The heating element may be configured to facilitate heating of the adhesive in order to reduce cure time thereof and/or to soften the adhesive to facilitate removal of the bracket from the structure.

The technical effects of the embodiments disclosed herein include the installation and removal of the adhesively bonded brackets from the mounting surface of the structure in a reduced amount of time without compromising the structural integrity of the structure. In this regard, the heat pad assembly facilitates the installation and removal of adhesively mounted brackets without damage to the structure such as face sheet damage, local delaminations or other damage.

More particularly, the heat pad assembly of the present disclosure facilitates the adhesive bonding of brackets to the structure and allows for selection of an optimal adhesive from among a wide variety without regard to the cure time of the adhesive. In this regard, an optimal adhesive possessing the desired performance characteristics (e.g., high peel strength and shear strength) but which may have an otherwise lengthy cure time may still be used in accordance with the embodiments disclosed herein which facilitate a reduction in cure time due to heat application. Such adhesives may also require heat-assisted softening from the cured state prior to removal. In this regard, the heat pad assembly of the present disclosure may facilitate a reduction in the amount of time required to instrument a vehicle or structure for test. Furthermore, the heat pad assembly may reduce the amount of time required for removing adhesively bonded brackets from the structure without undesirably affecting the structure during the removal process.

In a preferable embodiment, the heating element may be formed as a resistive sheet or a resistive wire to which the electrical current may be applied in order to generate heat. For example, the heating element may comprise a layer of conductive material such as a thin layer of metallic material having resistive properties that cause heating thereof during application of electrical current. The metallic layer is preferably formed in a suitable shape such as in a spiral shape to provide at least one opening or perforation through which the adhesive may bond the bracket to the structure. The metallic layer is preferably coated with an insulative coating to prevent conduction of electrical current from the heating element into the bracket and/or the structure. The metallic material may have an insulative coating which may be formed in any suitable manner such as by plating or deposition or any other suitable method.

In a further embodiment, the heat pad may assembly may include the pad layer and the heating element as separate components. The pad layer may be comprised of woven material or other suitable material having at least one perforation formed therein and through which the adhesive may bond the bracket to the structure. The heating element is preferably disposed in abutting contact with the pad layer. The heating element may be formed as a resistive sheet of conductive material that can resistively heat upon the application of electrical current. The heating element may also be formed as a resistive wire which may be spirally wound.

In another embodiment, the pad layer may comprise perforated upper and lower pad layers with the heating element being at least partially disposed therebetween. The pad layer may define upper and lower surfaces with a plurality of perforations extending through the upper and lower pad layers. The perforations facilitate the extension or passage of adhesive therethrough in order to interconnect and bond the bracket to the mounting surface. In one embodiment, the bracket may have a disc-shaped base having a perimeter edge. The pad layer may be sized and configured as a disc-shaped member which may be circular in shape and which may have a perimeter edge complementary in shape to the base perimeter edge.

The bracket may be configured in any size, shape and configuration and may be formed of any material including, but not limited to, composite material, metallic material, polymeric material or any combination thereof. For example, the bracket may be configured in a variety of geometric shapes such as a stud having a post extending from the base or as a nutplate, receptacle, spacer, standoff, blanket mount, bracket mount, webbing loop mount, sensor mount for various instrumentation, probe mount, patches and various alternative configurations for temporary and/or permanent installation of wiring and/or of hydraulic, pneumatic or other fluid lines including vacuum lines.

The heating element may preferably be formed as a resistive element which may include a pair of electrical contacts disposed on opposing ends of the heating element in order to facilitate conduction of electrical current therethrough for resistance heating of the resistive element. The upper and lower pad layers may be bonded or otherwise connected to one another along the perimeter edge of the heat pad assembly and may have the heating element disposed therewithin. However, it is contemplated that the upper and lower pad layers may be fastened together by mechanical means and/or at other locations other than along the perimeter edge such as at interior locations of the heat pad assembly.

In one embodiment, the resistive element of the heating element may be continuous within the pad assembly and may terminate at the electrical contacts which are preferably disposed on opposing ends of the resistive element. The electrical contacts may extend outwardly from the perimeter edge of the heat pad assembly. Electrical current may be applied to the heating element at the electrical contacts during curing of the adhesive and/or when removal of the bracket from the structure is desired. In this regard, the heat generated by the heating element may heat the adhesive in order to reduce cure time and/or to soften the adhesive for removal of the bracket.

The features, functions, and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein.

DETAILED DESCRIPTION

Figure 1:
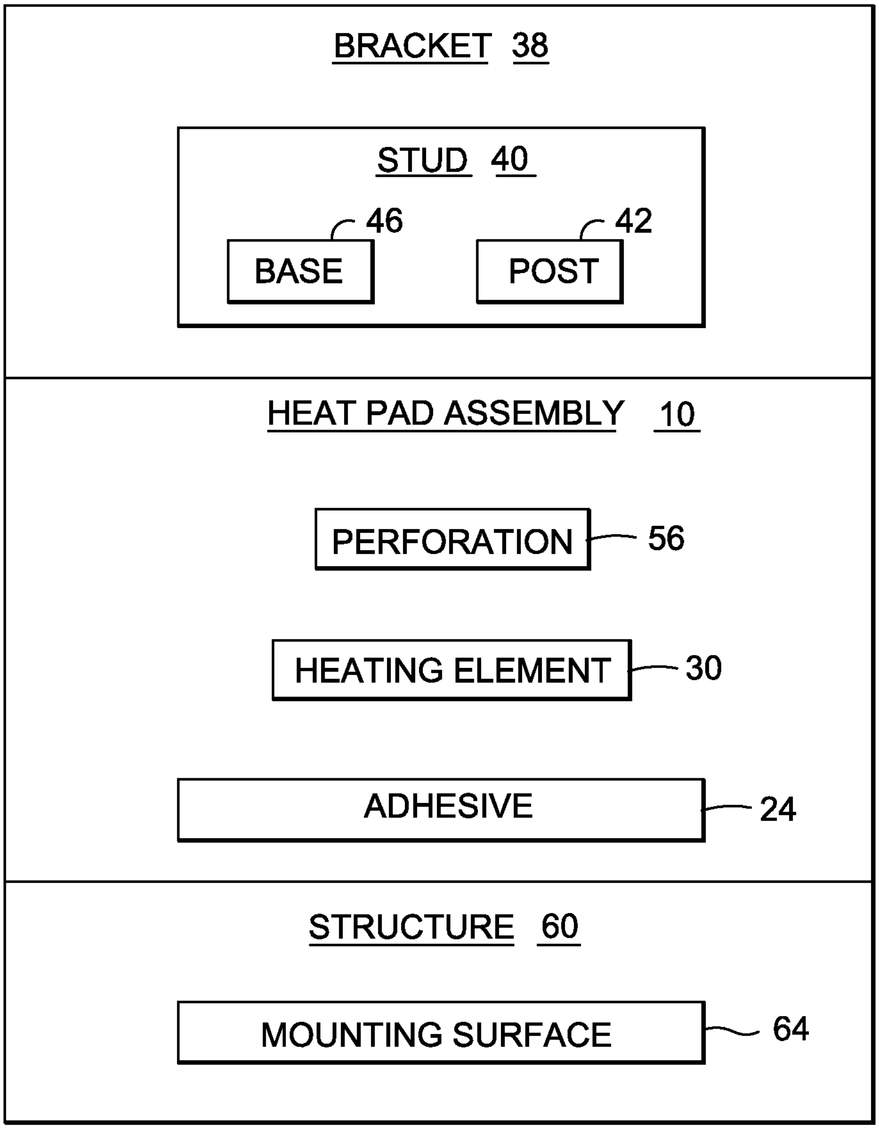
FIG. 1 is a block diagram illustrating a heat pad assembly in accordance with an advantageous embodiment.

Referring now to the drawings wherein the showings are for purposes of illustrating preferred and various embodiments of the disclosure only and not for purposes of limiting the same, FIG. 1 is a diagram illustrating a heat pad assembly 10 for mounting a bracket 38 to a mounting surface 64 of a structure 60 in accordance with an advantageous embodiment. The heat pad assembly 10 may comprise a heating element 30 which may include at least one and, more preferably, a plurality of perforations 56 to allow adhesive bonding of the bracket 38 to the structure 60. The heating element 30 may be configured to generate heat for heating adhesive 24 which bonds the bracket 38 to the structure 60.

Advantageously, heat generated by the heating element 30 may facilitate a reduction in the cure time of the adhesive 24 bonding the bracket 38 to the structure 60 during installation thereof. Likewise, heat generated by the heating element 30 may soften the adhesive 24 in order to facilitate removal of the bracket 38 from the mounting surface 64 of the structure 60 and to facilitate removal of adhesive 24 residue following removal of the bracket 38 without excess heating of bracket 38, mounting surface 64 and/or structure 60.

The structure 60 to which the bracket 38 may be mounted may include, without limitation, any vehicle, movable or non-movable object, machinery or other application wherein installation and removal of an adhesively mounted bracket 38 is desired. For vehicular applications, the mounting surface 64 may comprise an outer mold line of a vehicle such as a flight test vehicle. The flight test vehicle may be a production vehicle such as an aircraft which must be temporarily placed in a flight test configuration and, thereafter, returned to a production configuration for delivery to the customer. The vehicle is preferably provided back to the customer in as clean a production configuration as possible and preferably without any extraneous holes, flight test instrumentation, miscellaneous hardware or adhesive remaining thereon. In this regard, the heat pad assembly 10 facilitates installation and removal of brackets in a quick and convenient manner.

Material compositions of the structure 60 to which the bracket 38 may be mounted may include any metallic and/or nonmetallic material or combination thereof and may include composite material formed of layers or laminations 62. As was earlier mentioned, such laminations 62 may be undesirably affected upon the application of tensile forces in the transverse direction (i.e., normal to the surface) as may occur during attempts to remove the bracket 38 without softening of the adhesive. The structure 60 to which the bracket 38 may be adhesively bonded may comprise, without limitation, any configuration and may be formed of any material and in any size, shape or for any application. The mounting surface 64 to which the bracket 38 may be bonded may be provided in a bare condition without any coating or finish applied thereto. Alternatively, the mounting surface 64 to which the bracket 38 may be bonded may be provided with any suitable coating. Such coatings (not shown) on the mounting surface 64 may include, without limitation, any type of coating including primer, paint, plating such as electroplating, chemical treating or any other type of coating or finish.

The bracket 38 may be provided in any size, shape or configuration and may be used in any application including, but not limited to, testing applications and production. For example, the bracket 38 may be provided for use in converting a vehicle in a production configuration to a test configuration. The bracket 38 may be formed in a variety of materials including ceramic, polymeric, composite and/or metallic materials such as anodized aluminum in order to resist corrosion and reduce weight. Among the various shapes and sizes, the bracket 38 may be configured to at least include a nutplate which may be floating or non-floating, or as a receptacle, a spacer, a standoff with male or female threads, a mount such as a cable mount for mounting cables, an insulation blanket mount, a bracket mount, a webbing loop mount, a mount for a variety of sensors and probes and for various instrumentation such as transducers, accelerometers, and other hardware.

In addition, the bracket 38 may be formed to at least include a patch, a bushing for temporary installation of threaded fasteners, and for temporary and/or permanent support of wiring as well as support of hydraulic, pneumatic, fluid or vacuum lines. The bracket 38 may comprise a plurality of brackets 38 which may be mounted to the structure 60 via a single heat pad assembly 10 and/or using a quantity of heat pad assemblies 10 corresponding to the quantity of brackets 38. Likewise, the bracket 38 may be mounted to the mounting surface 64 of the structure 60 using a plurality of heat pad assemblies 10 for a single one of the brackets 38.

In one embodiment shown in FIGS. 2-5, the bracket 38 may be formed as a stud 40 having a post 42 extending upwardly from base 46. The post 42 may include a bore 44 formed therein which may be threaded in order to accept a threaded fastener for mounting of a clamp or other hardware thereto. In this regard, the threaded bore 44 may facilitate mounting of a "P" clamp to the post 42 as a standoff for supporting a wire bundle as was mentioned above.

Figure 4:
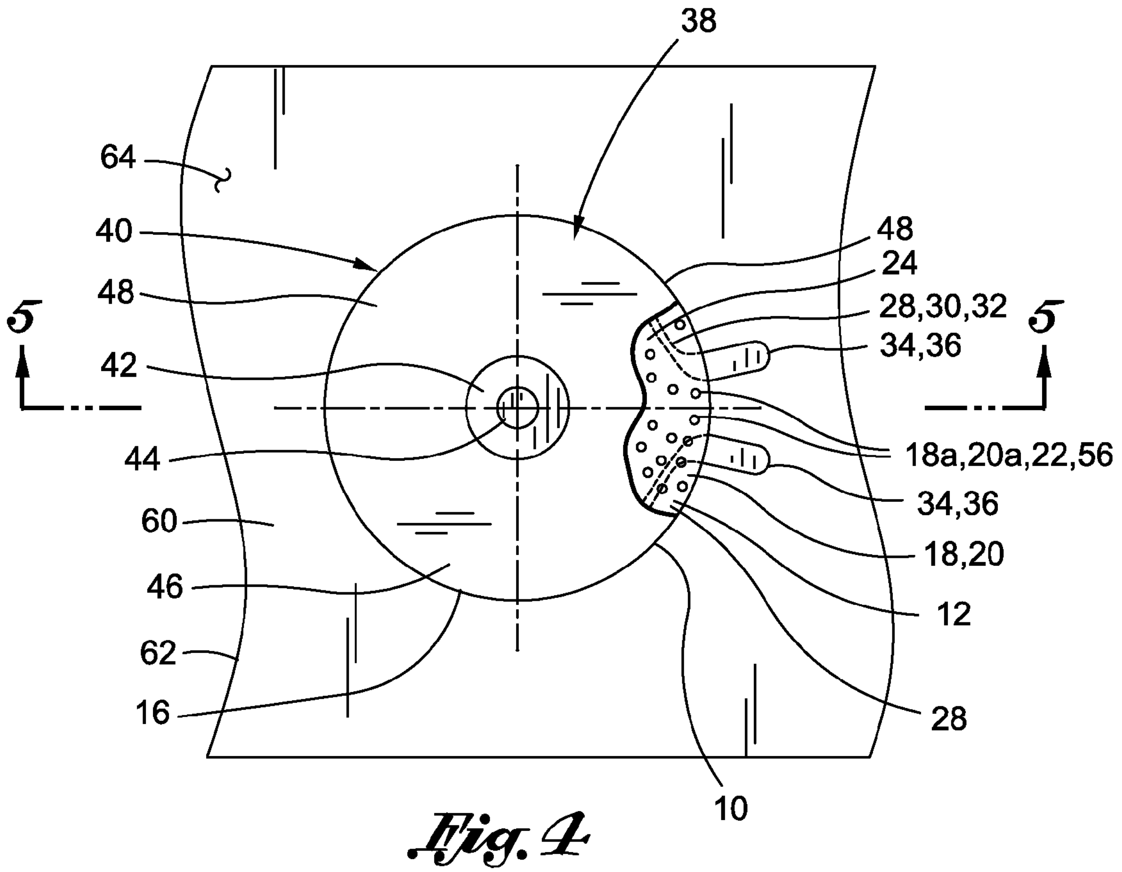
FIG. 4 is a partial cutaway plan view of the bracket mounted to the mounting surface and illustrating a pair of electrical contacts extending outwardly from the heat pad assembly.

As can be seen in FIG. 4, the base 46 of the bracket 38 may be complimentary in size and shape to the heat pad assembly 10. For example the bracket 38 may include a perimeter edge 48 which preferably matches or is substantially similar to a perimeter edge 16 of the heat pad assembly 10. The complimentary size and shape of the perimeter edge 16 of the heat pad assembly 10 and perimeter edge 48 of the base 46 may facilitate aligning the bracket 38 on a desired location of the structure 60 in addition to providing an aesthetically pleasing installation. Although shown as being generally round in shape, the perimeter edge 16 of the base 46 of the bracket 38 may be formed in a variety of alternative shapes such as, without limitation, non-rounded shapes such as square, rectangular, triangular, or a variety of other polygonal shapes.

In addition, the perimeter edge 48 of the base 46 of the bracket 38 may be formed in a variety of rounded shapes such as, without limitation, oval and elliptic shapes. Likewise, the perimeter edge 16 of the heating element 30 may be formed in any suitable rounded or non-rounded shape such as, for example and without limitation, the round and non-round shapes described above in relation to the perimeter edge 48 of the base 46 of the bracket 38. Although the shape, size and/or configuration of the perimeter edge 48 of the base 46 of the bracket 38 is preferably sized and configured to match the shape, size and/or configuration of the perimeter edge 16 of the heating element 30, such matching is not necessary such that disparate sizes, shapes and configuration are contemplated for the perimeter edge 16 and perimeter edge 48.

The heat pad assembly 10 may comprise a pad layer 26 or multiple pad layers 26 having at least one and, more preferably, a plurality of perforations 22 formed therein. Advantageously, the perforations 22 in pad layer 26 in cooperation with the perforations 56 in the heating element 30 facilitate interconnection of the bracket 38 to the mounting surface 64 using the adhesive 24 which may extend through the perforations when the bracket 38 is mounted to the mounting surface 64 of the structure 60. In this regard, the perforations allow direct contact of the adhesive 24 between the bracket 38 and the mounting surface 64 for bonding thereof.

The pattern and quantity of the perforations is preferably optimized in order to balance the ability to heat the adhesive 24 and facilitate direct bonding between the base 46 and the structure 60 such that sufficient load-carrying capability is provided. In this regard, the thickness of the pad layer 26 is preferably minimized in order to minimize the distance across which the adhesive 24 must span to bond the base 46 to the mounting surface 64.

The heating element 30 may be provided in any size, shape and configuration and is preferably configured to provide an optimized heat pattern to the adhesive 24 which facilitates bonding of the bracket 38 to the mounting surface 64. The heating element 30 is preferably configured to provide a uniform distribution of heat to the adhesive 24. However, it is contemplated that the heating element 30 may be configured to generate an asymmetric pattern of heat to the adhesive 24.

In either case, the heating element 30 is preferably configured to raise the temperature of the adhesive 24 such as up to or near its melting point in order to cause the adhesive 24 to soften allowing removal of the bracket 38 from the mounting surface 64. Likewise, the heating up of the heating element 30 may be such that the adhesive 24 sufficiently softens allowing removal of adhesive 24 residue which may remain on the mounting surface 64 following removal of the bracket 38.

Referring to FIGS. 2-3, 6A and 7, it can be seen that the heat pad assembly 10 may comprise the heating element 30 and a pad layer 26. When combined with the pad layer 26, the heating element 30 is preferably disposed in substantially abutting contact with the pad layer 26. The heating element 30 may be attached to the pad layer 26 such as by bonding or mechanical attachment. In the embodiment shown in FIGS. 6A and 7, the pad layer 26 may include upper and lower pad layers 18, 20 and the heating element 30 may be contained within the upper and lower pad layers 18, 20. Although not shown, the heating element 30 may also be disposed below or above at least one of the upper and/or lower pad layers 18, 20. In another embodiment not shown, it is also contemplated that the heating element 30 may comprise multiple heating elements 30 which may be arranged in any suitable size, shape, configuration or orientation.

Figure 2:
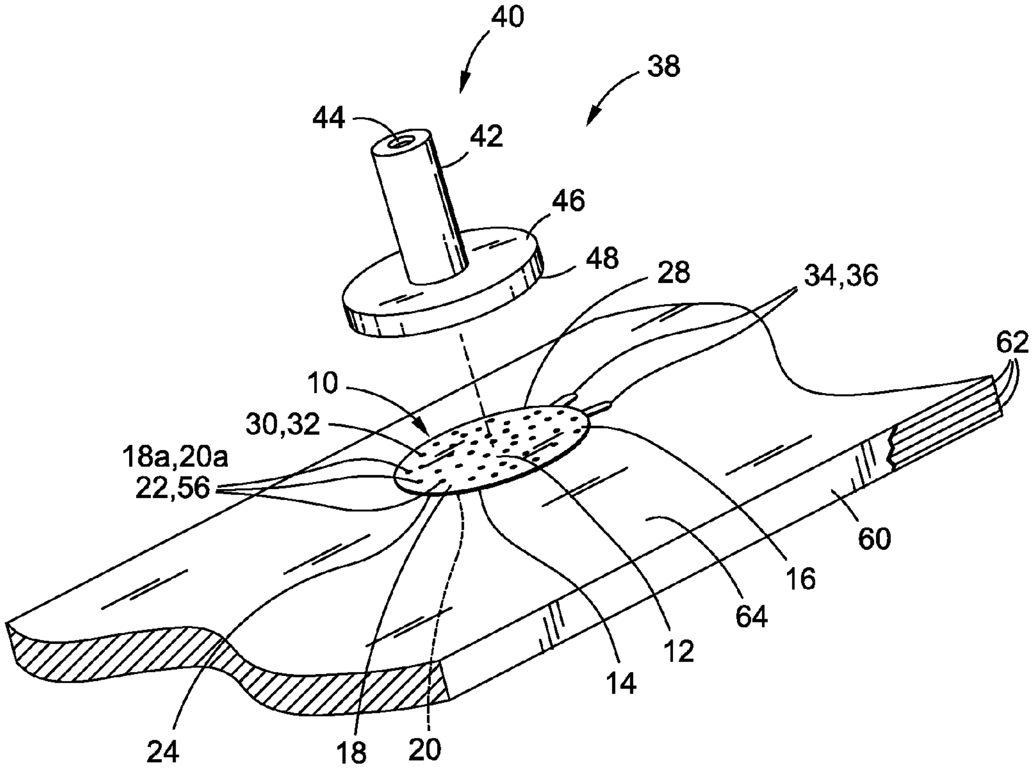
FIG. 2 is an exploded perspective illustration of the heat pad assembly for installation and/or removal of a bracket to a mounting surface of a structure.
Figure 3:
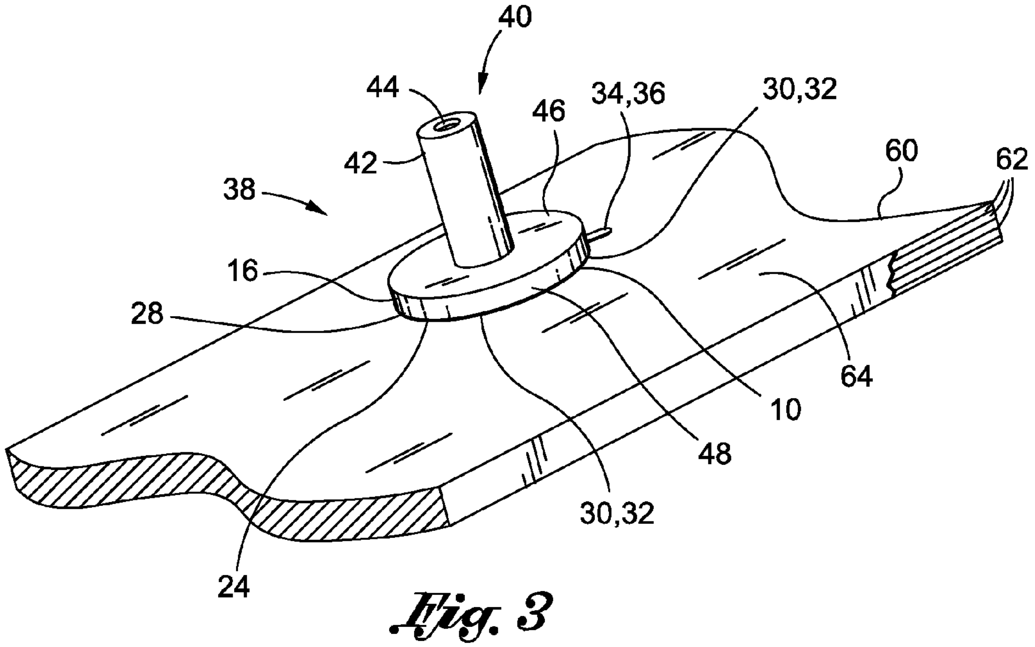
FIG. 3 is a perspective illustration of the bracket mounted to the mounting surface and having the heat pad assembly interposed therebetween.
Figure 6A:
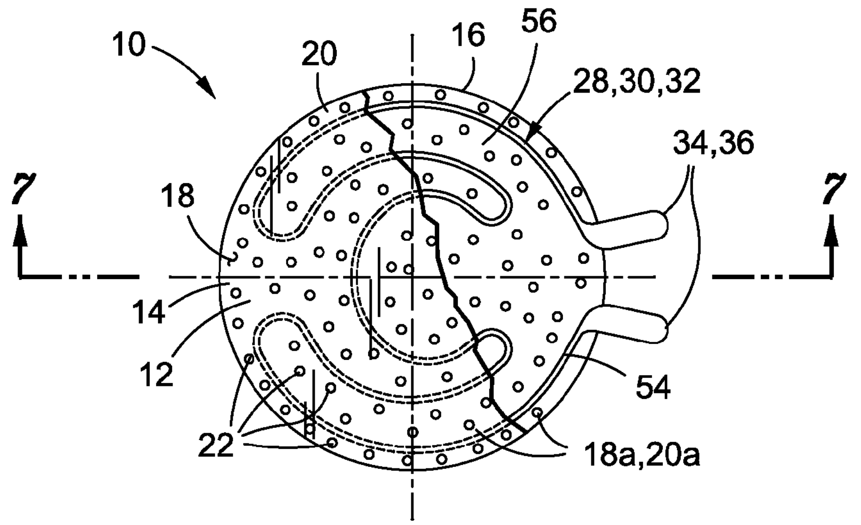
FIG. 6A is a plan view of the heat pad assembly in an embodiment wherein the heating element is disposed adjacent to a pad layer of the heat pad assembly.

As shown in FIGS. 2, 4 and 6A, the heating element 30 may include at least one, and more preferably, a pair of electrical contacts 34 disposed on opposing ends thereof in order to facilitate the application of electrical current to the heating element 30 for resistance heating thereof. The heat pad assembly 10 may include an upper surface 12 and a lower surface 14 with the upper surface 12 being configured to be disposed in abutting contact with the base 46. The lower surface 14 of the heat pad assembly 10 is configured to be disposed in abutting contact with the mounting surface 64 of the structure 60.

Figure 6B:
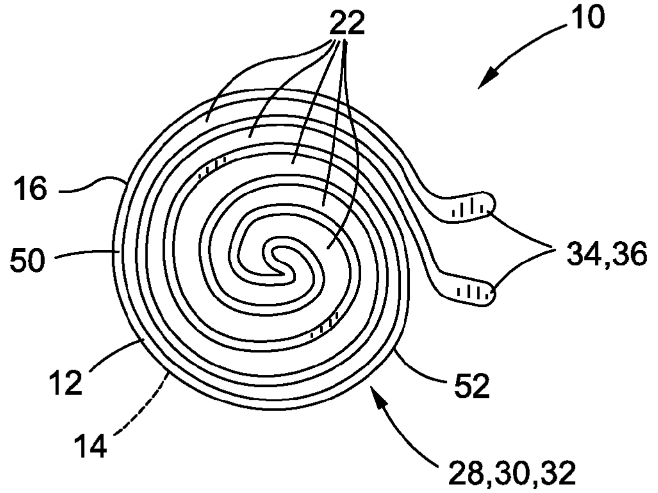
FIG. 6B is a plan view of the heat pad assembly in an embodiment wherein the heat pad assembly comprises the heating element.

In a preferable embodiment best seen in FIG. 6B, the heat pad assembly 10 may comprise the heating element 30 which may be configured as a resistive element 32 such as a resistive sheet 52. The resistive sheet 52 may be formed of any conductive material such as relatively thin metallic material although non-metallic material may be used. When formed as a resistive sheet 52, any suitable fabrication process may be utilized such as by water jet cutting, machining, stamping or other suitable processes to from the resistive sheet 52 in any suitable configuration such as in the double-spiral configuration shown in FIG. 6B. However, the resistive sheet 52 may be provided in alternative shapes, sizes and configurations.

An insulative coating 50 may preferably be formed on the resistive sheet 52 to prevent conduction of electrical current into the bracket 38 and/or the structure 60. The insulative coating 50 may be applied to the resistive sheet 52 by coating, plating, deposition or any other suitable means.

The resistive element 32 is preferably, but optionally, continuous between electrical contacts 34 or tabs 36 formed on opposing ends of the resistive element 32. Although the electrical contacts 34 or tabs 36 are shown in FIG. 6B as extending from the same side of the resistive element 32, the electrical contacts 34 or tabs 36 may be formed on opposite sides of the resistive element 32. Other positions or arrangements of the electrical contacts 34 or tabs 36 are also contemplated.

In the embodiment shown in FIG. 6A, the resistive element 32 may be configured as a resistive wire 54 which is preferably configured to provide uniform application of heat to the adhesive 24 across the pad layer 26 when electrical current is passed through the resistive wire 54. The resistive wire 54 may be arranged in a semi-wound pattern and is preferably continuous between the electrical contacts 34 which may extend outwardly from the perimeter edge 16. Regardless of the exemplary configurations illustrated in the figures, it is contemplated that the resistive element 32, when configured as either a resistive sheet 52 or as a resistive wire 54, may be formed as a meandering or random pattern configured to provide a desired heat distribution pattern in the adhesive 24.

The heating element 30 may be formed with the pad layer 26 wherein the pad layer 26 may comprise a woven material although any material type and configuration may be used to fabricate the pad layer 26. The illustrations of the heat pad assembly 10 for mounting the bracket 38 to the structure 60 is not meant to imply any architectural or physical limitation in the configuration of the heat pad assembly 10 or manner in which the different advantageous embodiments may be implemented.

Figure 5:
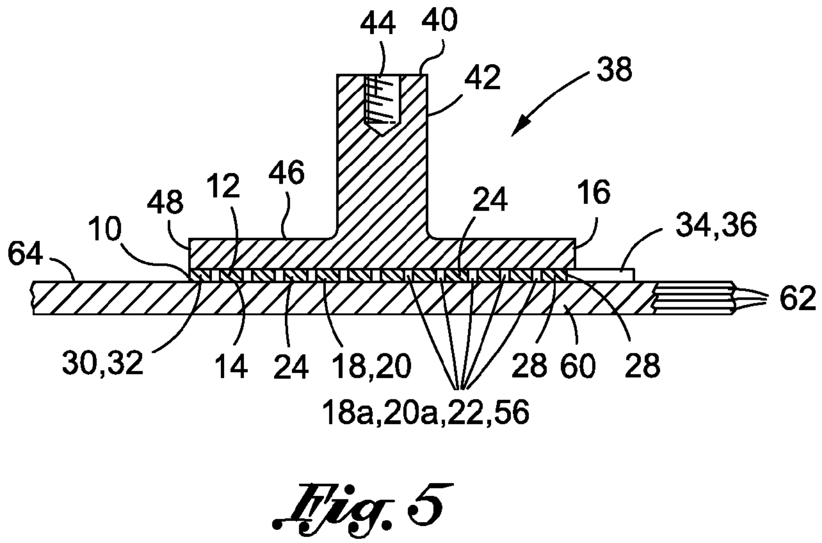
FIG. 5 is a sectional view taken along lines 5-5 of FIG. 4 and illustrating the heat pad assembly interposed between the bracket and the structure.

Referring to FIGS. 4 and 5, shown is the bracket 38 installed on the structure 60 with the heat pad assembly 10 interposed between the bracket 38 and the mounting surface 64. The perimeter edge 48 of the base 46 of the bracket 38 is shown as being formed complementary to the perimeter edge 16 of the heat pad assembly 10. The partial cutaway of the bracket 38 base 46 illustrates the heating element 30 of the heat pad assembly 10 which extends inwardly from the electrical contacts 34 or tabs 36 formed with the heat pad assembly 10. Also visible in FIG. 4 are the plurality of perforations 18*a*, 20*a*, 22, 56 which are substantially uniformly distributed across the area of the heat pad assembly 10 and the heating element 30 to facilitate adhesive 24 bonding between the base 46 and the mounting surface 64.

Referring to FIG. 5, shown is a sectional view illustrating the heat pad assembly 10 installed between the bracket 38 base 46 and the mounting surface 64 of the structure 60. The heat pad assembly 10 may include an upper surface 12 and a lower surface 14 with the upper surface 12 being configured to be disposed in abutting contact with the base 46. The lower surface 14 of the heat pad assembly 10 is configured to be disposed in abutting contact with the mounting surface 64 of the structure 60. As was earlier mentioned, the structure 60 may be formed as a composite structure 60 having a plurality of laminations 62. The heat pad assembly 10 may be mounted on the uppermost one of the laminations 62 which comprises the mounting surface 64 for the heat pad assembly 10.

The electrical tabs 36 can be seen extending outwardly from the perimeter edge 16 of the heat pad assembly 10 and which may be formed complementary to the perimeter edge 48 of the base 46. In the embodiment shown, the heat pad assembly 10 may be provided as a disc-shaped element which is sized and configured to match the circular shape of the base 46. However, as was earlier mentioned, it is contemplated that the heat pad assembly 10 may be provided in other shapes, sizes and configurations and it is not necessary that the perimeter edge 16 of the heat pad assembly 10 matches the size, shape and configuration of the perimeter edge 48 of the base 46 of the bracket 38.

Figure 7:
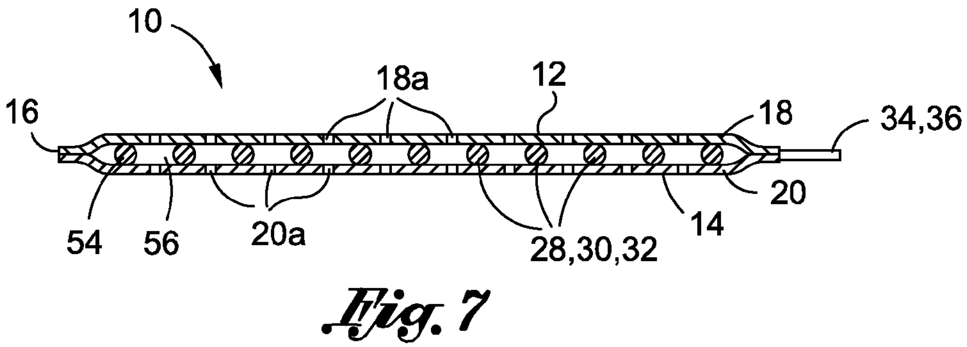
FIG. 7 is a sectional view of the heat pad assembly taken along lines 7-7 of FIG. 6A and illustrating upper and lower pad layers of the heat pad assembly and having the heating element interposed therebetween.

Referring to FIGS. 6A and 7, shown is the heat pad assembly 10 having the upper and lower pad layers 18, 20 and having the heating element 30 interposed therewithin. In this regard, the heating element 30 may be captured or sandwiched between the upper and lower pad layers 18, 20. Although the heating element 30 is shown as being completely contained between the upper and lower pad layers 18, 20 and within the perimeter edge 16 of the heat pad assembly 10, it is contemplated that the heating element 30 may be only partially disposed between the upper and lower pad layers 18, 20.

As best seen in FIG. 7, the upper and lower pad layers 18, 20 may each be provided with a plurality of perforations 18*a*, 20*a*. In one embodiment, the upper and lower pad layers 18, 20 are preferably formed of non-conductive material or have non-conductive properties to prevent conduction of electrical current applied to the heating element 30 and which may otherwise flow into the structure 60 and/or bracket. In this regard, the heating element 30 may be comprised of a resistance-heating conductive element 28 which is configured to generate heat upon the passing of an electrical current therethrough via the electrical contacts 34. Furthermore, the heating element 30 may be coated with an insulative coating 50 as will be described in greater detail below. Although only a single continuous conductive element 28 is shown, any number of heating elements 30 or conductive elements 28 may be included and may be provided in any size, shape and configuration.

In one embodiment, the pad layer 26 and heating element 30 may be provided as a unitary structure. For example, the pad layer 26 and heating element 30 may be formed of a porous or fibrous material (not shown) which facilitates adhesive 24 bonding of the bracket 38 to the mounting surface 64. The porous material may comprise random or uniform perforations configured to facilitate bonding of the bracket 38 to the mounting surface 64.

Figure 8:
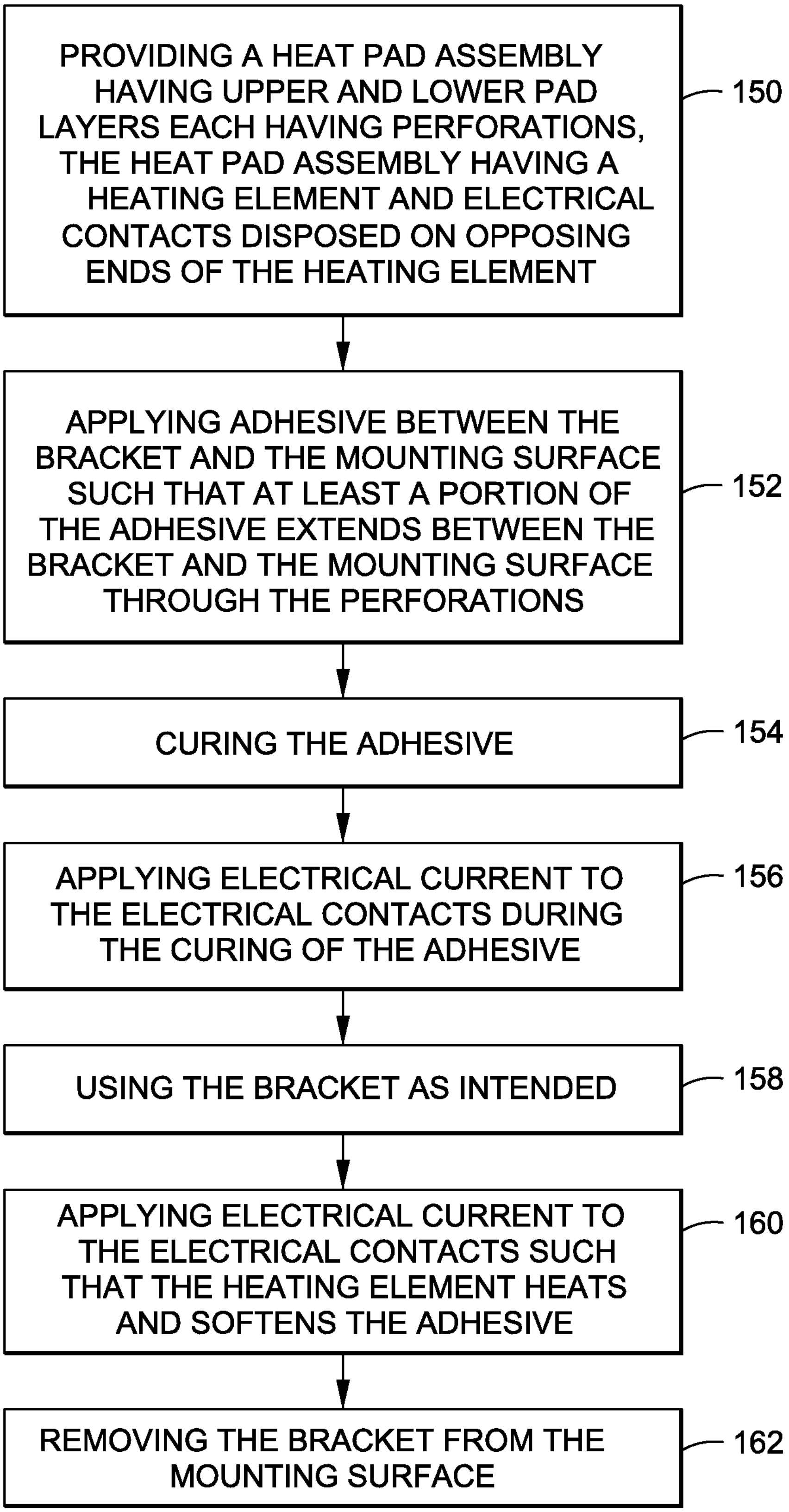
FIG. 8 is a flow diagram of a method of installing and removing a bracket.

Referring to FIG. 8, a method of installing and removing the bracket 38 on the mounting surface 64 will now be described. As was indicated above, the heat pad assembly 10 is advantageously provided in order to facilitate installation and removal of the bracket 38 from the mounting surface 64. Step 150 of the method may comprise providing the heat pad assembly 10 having at least one pad layer 26 and, more preferably, an upper and a lower pad layer 18, 20 wherein each pad layer has perforations formed therethrough.

The heat pad assembly 10 preferably includes the heating element 30 which may be interposed between the upper and lower pad layers 18, 20 and may further include the electrical contacts 34 disposed on opposing ends of the heating element. As was indicated above, the heating element 30 may be comprised of the conductive element 28 which may be configured to generate heat upon the passing of an electrical current therethrough. The conductive element 28 may be comprised of resistive element 32 which may be formed as a resistive wire 54 that may be continuous within the heat pad assembly 10 and which may be arranged therewithin in a meandering pattern or in a spirally wound pattern or other suitable pattern. More preferably, the resistive element 32 may be formed as the resistive sheet 52 which may be coated or plated with insulative coating 50 as may the resistive wire 54.

Step 152 comprises applying adhesive 24 between the bracket 38 and the mounting surface 64 of the structure 60 and, more preferably, such that a portion of the adhesive 24 extends through the perforations 18*a*, 20*a* in the upper and lower pad layers 18, 20 or, if a single pad layer 26 is used, through the perforations 22 formed therein and/or in the perforations 56 formed in the heating element 30 in order to adhesively bond the bracket 38 to the structure 60. The perforations may comprise a single perforation or, more preferably, a plurality of perforations which may be formed in the respective components and which may be arranged in any pattern that facilitates optimal bonding between the bracket 38 and the structure 60.

Step 154 comprises curing the adhesive 24 which may be performed simultaneously with step 156 which comprises applying electrical current to the electrical contacts 34 of the heating element 30 during the curing of the adhesive. The application of electrical current to the heating element 30 may cause heat to be generated which may reduce cure time of the adhesive. In step 158, the bracket 38 may be used as intended such as for mounting various components. Such components may include flight test hardware such as wire bundles, instrumentation and other components.

Step 160 may comprise the step of applying electrical current to the electrical contacts 34 of the heating element 30 such that the heating element 30 heats up and softens the adhesive 24 in order to facilitate removal of the bracket 38. In step 162, the bracket 38 may be removed from the mounting surface 64 in a greatly reduced amount of time and with less force than would be required for applications where heat is not provided to the adhesive 24 for softening.

Electrical current may be supplied to the resistive element 32 at the electrical contacts 34 disposed on opposing ends of the resistive element 32. Such electrical current may be provided through a suitable power supply (not shown) which, in one embodiment, may be configured as a portable A.C. or D.C. power supply of preferably low voltage. The power supply circuitry may include a controller which may allow for variable application of electrical current in order to control the amount of heat which is generated by the heating element.

A feedback system (not shown) such as a display may be provided in order to indicate a temperature of the heating element 30 such that the proper amount of heat may be delivered depending upon the material composition of the structure 60 and/or material composition of the adhesive. For applications wherein the structure 60 is constructed of composites, the temperatures generated by the heating element 30 may be limited to a predetermined level such as below 200° Fahrenheit.

The adhesive 24 which may be used to bond the bracket 38 to the mounting surface 64 may be any suitable adhesive 24 such as a 2-part adhesive that may be room temperature cured within a predetermined amount of time or may be cured with the application of heat using the embodiments disclosed herein. However, the adhesive 24 may be configured, without limitation, as any adhesive other than, or in addition to, the 2-part adhesive mentioned above.

The bracket 38 may be formed as a stud 40 similar to that which is commercially available from Click Bond, Inc. of Carson City, Nev. and which may be utilized as a device for supporting wire bundles or for supporting test instrumentation or for other purposes. However, the bracket 38 may be provided in a variety of alternative configurations as indicated above. Furthermore, the bracket 38 may be fabricated of any material including, but not limited to, composite and/or metallic materials as well as polymeric materials including injection molded polyetherimide (PEI) which may optionally include glass reinforcement. Installation of the bracket 38 over the heat pad assembly 10 to the mounting surface 64 of the structure 60 may be further facilitated with the use of a fixturing device (not shown) facilitating the application of positive pressure on the bracket 38 against the structure 60 during curing of the adhesive.

Figure 9:
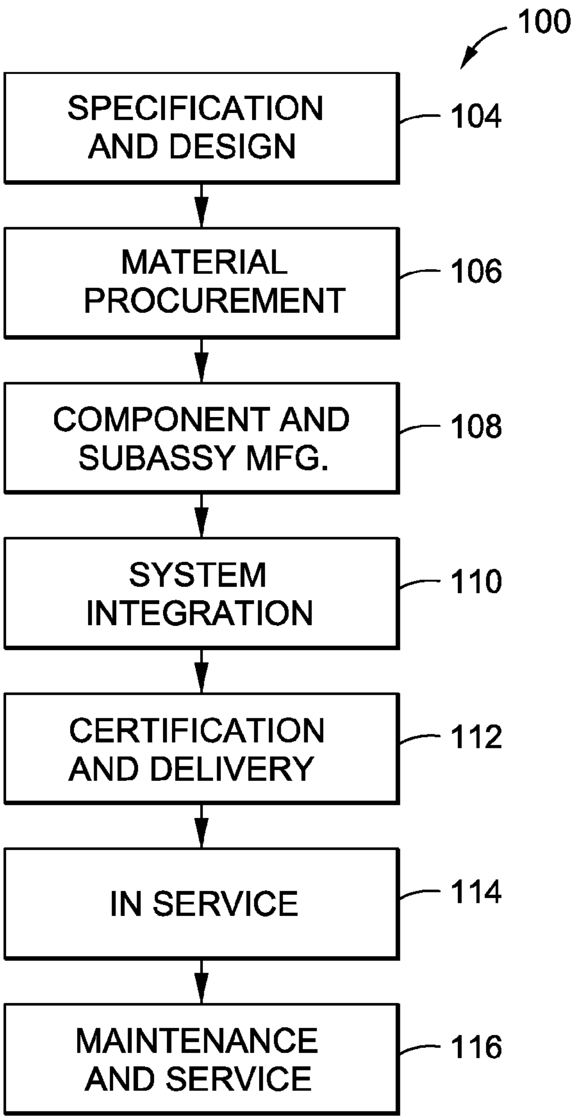
FIG. 9 is a flow diagram of aircraft production and service methodology.
Figure 10:
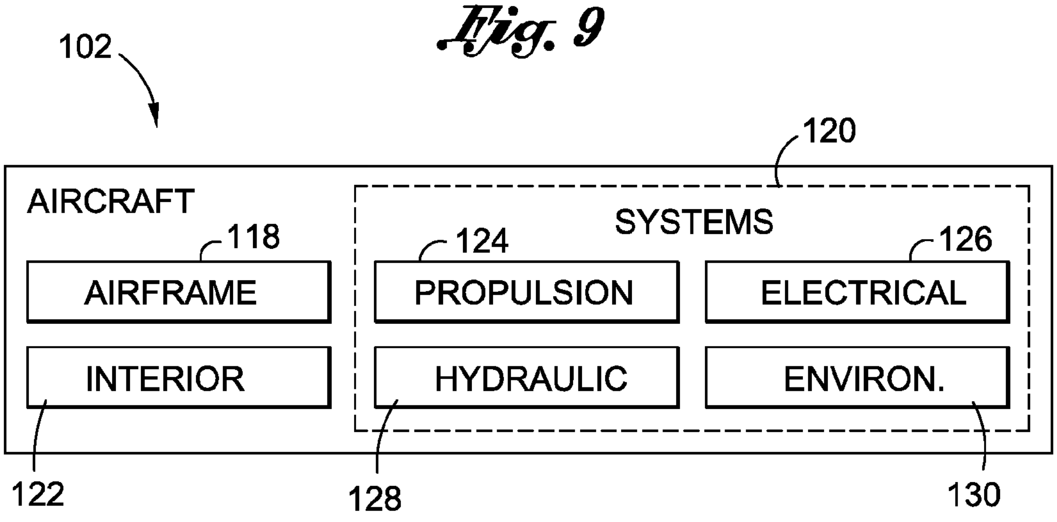
FIG. 10 is a block diagram of an aircraft.

Referring to FIGS. 9-10, embodiments of the disclosure may be described in the context of an aircraft manufacturing and service method 100 as shown in FIG. 9 and an aircraft 102 as shown in FIG. 10. During pre-production, exemplary method 100 may include specification and design 104 of the aircraft 102 and material procurement 106. During production, component and subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 10, the aircraft 102 produced by exemplary method 100 may include an airframe 118 with a plurality of systems 120 and an interior 122. Examples of high-level systems 120 include one or more of a propulsion system 124, an electrical system 126, a hydraulic system 128, and an environmental system 130. Any number of other systems may be included. Although an aerospace example is shown, the principles of the disclosed embodiments may be applied to other industries, such as the automotive industry.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 102 is in service. Also, one or more apparatus embodiments, method embodiments, or a combination thereof may be utilized during the production stages 108 and 110, for example, by substantially expediting assembly of or reducing the cost of an aircraft 102. Similarly, one or more of apparatus embodiments, method embodiments, or a combination thereof may be utilized while the aircraft 102 is in service, for example and without limitation, to maintenance and service 116.

The above description is given by way of example, and not limitation. Given the above disclosure, one skilled in the art could devise variations that are within the scope and spirit of the embodiments disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method of installing a bracket on a mounting surface, comprising the steps of:

applying adhesive between the bracket and the mounting surface such that at least a portion of the adhesive extends between the bracket and the mounting surface;

locating a heat pad assembly between the bracket and the mounting surface, the heat pad assembly comprising a heating element interposed between upper and lower pad layers formed of woven material and having perforations substantially uniformly distributed across the area of the heat pad assembly, the heating element having electrical contacts disposed on opposing ends thereof; and applying electrical current to the electrical contacts during the curing of the adhesive such that the heating element heats the adhesive to reduce cure time.

2. The method of claim 1 wherein:

the step of applying adhesive between the bracket and the mounting surface comprising applying adhesive such that at least a portion thereof extends through the perforations;

the method further comprising the steps of:

applying electrical current to the electrical contacts such that the heating element heats and softens the adhesive; and removing the bracket from the mounting surface.

3. The method of claim 1 further comprising the step of:

applying the heat uniformly across the heating element when the electrical current is applied to the electrical contacts.

* * * * *